US009332377B2

(12) United States Patent
Agardh et al.

(10) Patent No.: US 9,332,377 B2
(45) Date of Patent: May 3, 2016

(54) DEVICE AND METHOD FOR CONTROL OF DATA TRANSFER IN LOCAL AREA NETWORK

(71) Applicant: Sony Corporation, Tokyo (JP)

(72) Inventors: Kare Agardh, Rydeback (SE); Aleksandar Rodzevski, Malmo (SE); Per Astrand, Lund (SE); Henrik Bengtsson, Lund (SE); Kristian Tarnhed, Lund (SE); Thomas Bolin, Lund (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/318,025

(22) Filed: Jun. 27, 2014

(65) Prior Publication Data

US 2015/0326997 A1    Nov. 12, 2015

Related U.S. Application Data

(60) Provisional application No. 61/912,223, filed on Dec. 5, 2013, provisional application No. 61/942,753, filed on Feb. 21, 2014.

(51) Int. Cl.
*H04B 7/00* (2006.01)
*H04W 4/00* (2009.01)
(Continued)

(52) U.S. Cl.
CPC ............ *H04W 4/008* (2013.01); *H04B 13/005* (2013.01); *H04L 9/3215* (2013.01);
(Continued)

(58) Field of Classification Search
CPC ... H04W 84/005; H04W 84/18; H04W 12/06; H04W 12/04; H04W 12/08; H04W 4/003; H04W 74/0891; H04W 88/06; H04W 8/18; H04W 92/18; H04W 12/12; H04W 4/008; H04W 52/0219; H04W 52/0225; H04W 74/06; H04W 8/005; H04W 92/08

USPC .......................................................... 455/41.2
See application file for complete search history.

(56) References Cited

U.S. PATENT DOCUMENTS 6,211,799 B1    4/2001    Post et al.
6,580,356 B1    6/2003    Alt et al.
(Continued)

FOREIGN PATENT DOCUMENTS

EP    1024626 A1    8/2000
EP    1102215 A2    5/2001
(Continued)

OTHER PUBLICATIONS

Zimmerman, "Personal Area Networks: Near-Field intrabody communication," XP 000635090 IBM Systems Journal, vol. 35, Nos. 3&4, 1996, pp. 609-617.
(Continued)

*Primary Examiner* — Ajibola Akinyemi
(74) *Attorney, Agent, or Firm* — Tucker Ellis LLP (57) ABSTRACT

The present invention concerns devices and methods for control of data transfer in a personal area network. The data transfer being performed by body coupled communication (BCC) and short-range wireless communication between a first portable electronic communication device (10) and a second portable electronic communication device (20, 30). The devices being adapted to be in close proximity to a body of a user and the first portable electronic communication device (10) is configured to initiate and perform execution of predefined actions by means of the method to cooperate with the second portable electronic communication device (20, 30) in a system/personal area network.

10 Claims, 8 Drawing Sheets

(51) Int. Cl.
*H04W 76/02* (2009.01)
*H04B 13/00* (2006.01)
*H04L 9/32* (2006.01)
*B60R 25/20* (2013.01)
*G06F 21/34* (2013.01)

(52) U.S. Cl.
CPC ......... *H04W 76/023* (2013.01); *B60R 25/2027* (2013.01); *G06F 21/34* (2013.01); *H04L 2209/805* (2013.01); *H04W 76/02* (2013.01)

(56) References Cited

U.S. PATENT DOCUMENTS

| | | | |
|---|---|---|---|
| 7,202,773 | B1 | 4/2007 | Oba et al. |
| 8,253,693 | B2 * | 8/2012 | Buil .................... H04B 13/005 345/1.1 |
| 8,867,995 | B2 * | 10/2014 | Kim .................... H04B 13/005 345/163 |
| 2002/0128030 | A1 | 9/2002 | Eiden et al. |
| 2004/0203381 | A1 | 10/2004 | Cahn et al. |
| 2004/0248513 | A1 | 12/2004 | Glass et al. |
| 2005/0008148 | A1 | 1/2005 | Jacobson |
| 2005/0243061 | A1 | 11/2005 | Liberty et al. |
| 2006/0109135 | A1 | 5/2006 | Donat et al. |
| 2006/0258408 | A1 | 11/2006 | Tuomela et al. |
| 2007/0145119 | A1 | 6/2007 | Rhelimi |
| 2007/0190940 | A1 | 8/2007 | Lee et al. |
| 2007/0282783 | A1 | 12/2007 | Singh |
| 2008/0259043 | A1 * | 10/2008 | Buil et al. ..................... 345/173 |
| 2009/0094681 | A1 | 4/2009 | Sadler et al. |
| 2009/0233548 | A1 | 9/2009 | Andersson et al. |
| 2010/0003917 | A1 | 1/2010 | Hebiguchi et al. |
| 2010/0113950 | A1 | 5/2010 | Lin et al. |
| 2010/0263031 | A1 | 10/2010 | Tsuchiya |
| 2010/0277435 | A1 | 11/2010 | Han et al. |
| 2010/0311326 | A1 | 12/2010 | Klabunde et al. |
| 2010/0312071 | A1 | 12/2010 | Schenk |
| 2011/0205156 | A1 | 8/2011 | Gomez et al. |
| 2012/0026129 | A1 | 2/2012 | Kawakami |
| 2012/0133605 | A1 | 5/2012 | Tanaka |
| 2012/0249409 | A1 | 10/2012 | Toney et al. |
| 2012/0324368 | A1 | 12/2012 | Putz et al. |
| 2013/0017789 | A1 | 1/2013 | Chi et al. |
| 2013/0174049 | A1 | 7/2013 | Townsend et al. |
| 2014/0085050 | A1 | 3/2014 | Luna |
| 2014/0325614 | A1 | 10/2014 | Rhelimi |

FOREIGN PATENT DOCUMENTS

| | | |
|---|---|---|
| EP | 1220501 A2 | 7/2002 |
| EP | 2018038 A2 | 1/2009 |
| EP | 2378748 A1 | 10/2011 |
| EP | 2600319 A1 | 6/2013 |
| JP | 2007073462 A | 4/2008 |
| JP | 2009049951 A | 3/2009 |
| WO | 2007096810 A1 | 8/2007 |
| WO | 2007129237 A1 | 11/2007 |
| WO | 2011021531 A1 | 2/2011 |

OTHER PUBLICATIONS

W. Knight, "Human Handshake Opens Data Stream," NewScientist.com, Oct. 7, 2002 http://www.newscientist.com/article/dn2891-human-handshake-opens-data-stream.html.

W. Knight, "Skin Used to Transmit Key Data," NewScientist.com, Aug. 5, 2004, http://www.newscientist.com/article/dn6247-skin-used-to-transmit-key-data.html.

"The Nymi White Paper", Nov. 19, 2013, XP055115588, pp. 3,5,6,14-21.

Bionym Inc.: "Nymi by Bionym" Sep. 2, 2013, YouTube Video retrieved from the Internet May 7, 2014 at URL: https://www.youtube.com/watch?v=jUO7Qnmc8vE#t=37.

PCT International Search Report and Written Opinion issued for corresponding international application No. PCT/IB2014/066626 mailed Apr. 20, 2015, 12 pages.

* cited by examiner

DEVICE AND METHOD FOR CONTROL OF DATA TRANSFER IN LOCAL AREA NETWORK

TECHNICAL FIELD

The present invention relates to a device and a method for data transfer and control of said data transfer close to a person's body, which device is a portable electronic communication device adapted for both wireless and Body Coupled Communication with at least one further portable electronic communication device creating a system in a personal area network.

BACKGROUND ART

Earpieces, earphones, headsets, headphones or other handsfree solutions are commonly utilized to keep the sound private and/or to facilitate multitasking when listening to music, talking in the phone, getting body function updates from your wristlet etc. Due to the rapid development of new electronic devices, e.g. mp3 players, tablets, smart phones, wearables, etc., where the sound experience plays an important role, the technique for transmittal of sound to the earpieces has undergone major improvements.

Conventional headphones or earpieces are generally wired to audio devices. However, such systems are not really convenient for the user. For example, the wires disturb the user because she/he cannot move as freely as usual and the wires also have a tendency to end up in a tangle. Moreover, there is a risk of breaking the wires or any of its contacts, which makes the complete headset unusable.

For some time, wires can be avoided by utilizing different kinds of short range wireless solutions, also referred to as Personal Area Network (PAN) solutions. Examples are; Bluetooth® (BT), infrared Data Association (IrDA), ZigBee®, Ultra WideBand (UWB), etc. However, the radio-frequency (RF) techniques have some drawbacks, e.g. there might be a limited operating time due to relatively high power consumption of the RF transceiver, there is a risk of interference with other RF systems operating in the same frequency band, and the user is exposed to potentially harmful RF radiation. Moreover, the user needs to manually pair wearables, e.g. wristlets with the portable electronic device, in order to establish a RF connection between them.

Even though the above-mentioned known devices and methods of controlling data transfer between portable electronic devices, by wire or wirelessly, are relatively straightforward for a user of mobile devices and wearables, such as mobile telephones, headphones, headsets, microphones, speakers and/or wristlets, there is an increasing demand in the audio and mobile phone market for even more easy, quick and user-friendly ways of using a mobile phone or other portable electronic device and wearable communication devices, e.g. headsets.

In particular, with regard to audio and voice communication, there is a need to simplify the user interaction with mobile phones and any headphones, and there is a need for faster, easier and more intuitive ways of controlling pairing of such devices by means of easy and convenient methods. Moreover, there is a need to guarantee that it is the correct headphones that are connected to the electronic device. It is important to ensure that the user's electronic device establish a connection with the user's own headphones, and not with the headphones of someone else, i.e. the user's portable electronic device should not establish a connection with another pair of headphones belonging to the person next to the user on the bus or the train.

SUMMARY OF THE INVENTION

With the above description in mind, then, an aspect of the present invention is to provide a device and method for control of data transfer between wearable mobile electronic communication devices that can be used in close proximity to a body of a user, and/or in partial or entire/full contact with the user's body, which seek to mitigate, alleviate, or eliminate one or more of the above-identified deficiencies in the art and disadvantages singly or in any combination.

These and further objects are achieved by a device and method cooperating as a system and a local/personal/body area network for controlling data transfer between at least two or three or more wearable and portable electronic communication devices comprising at least one sensor or antenna adapted for Body-Coupled/-Based Communication (BCC/BBC).

With the above description in mind, then, an aspect of the present invention is to provide an electronic device that enables instant generation of audio and/or video in a wearable device without having to actively and manually pair the wearable device to another portable device that sends audio and/or video via wireless data transfer to the wearable device. These and further objects are achieved by a first portable electronic communication device being arranged for cooperating with a second portable electronic communication device via Body Coupled Communication (BCC) and short-range wireless communication. The two devices are configured to be in close proximity to a person's body during use. This first portable electronic communication device comprises: an antenna adapted for BCC and a control unit with associated processing circuitry configured for control of BCC and short-range wireless communication with the second portable electronic communication device causing the first portable electronic communication device to initiate and perform execution of predefined actions. The actions comprise continuously checking, by means of the first portable electronic communication device itself, if a capacitance belongs to a predefined capacitance interval indicating that the first portable electronic communication device is in close proximity to the body of the user. The actions comprise triggering the control unit of the first portable electronic communication device to initiate BCC by itself via its BCC antenna with the second device in response to the checked capacitance. The actions comprise sending, by means of the control unit via the BCC antenna of the first portable electronic communication device itself, a BCC signal over the user's body in response to the checked capacitance comprising short-range wireless communication pairing information to the second device. The actions comprise triggering the control unit of the first portable electronic communication device to prepare a short-range wireless communication by itself with the second device. The actions comprise executing the short-range wireless communication between the first and the second device if also this second device is in close proximity to the body of the same user.

According to one aspect of the disclosure, it provides a first portable electronic communication device, wherein the control unit is configured to cause the first portable electronic communication device to, by itself, continuously measure capacitance by means of its BCC antenna.

According to a further aspect of the disclosure, it provides a first portable electronic communication device, wherein the control unit is configured to cause the first portable communication device to, by itself, continuously compare the measured capacitance of its BCC antenna with capacitance data stored in the first portable electronic communication device, and to continuously determine, by itself, if the measured capacitance of its BCC antenna belongs to a predefined capacitance range/interval indicating that the first portable communication device is in close proximity to the body of the user.

According to another aspect of the disclosure, it provides a first portable electronic communication device, wherein the control unit of the first portable communication device is configured to control short-range wireless communication signals sent from the second communication device and received in the first portable communication device for initiating a short-range wireless communication between the devices.

According to yet another aspect of the disclosure, it provides a first portable electronic communication device, wherein the control unit of the first portable electronic communication device is configured to end the execution of the short-range wireless communication with the second communication device, by means of the first portable electronic communication device itself, if the checked capacitance of the BCC antenna of the first portable electronic communication device indicates that the first portable device no longer is in close proximity to the body of the user.

According to another aspect of the disclosure, it provides a first portable electronic communication device, wherein the control unit is configured to unpair the first portable electronic communication device and the second communication device.

According to still another aspect of the disclosure, it provides a first portable electronic communication device, wherein the first portable electronic communication device is a wearable, e.g. headphone, headset, visors or goggles or a combination of such wearables.

With the above description in mind, then, an aspect of the present invention is to provide a method that enables instant generation of audio and/or video in a wearable device without having to actively and manually pair the wearable device to another portable device that sends audio and/or video via wireless data transfer to the wearable device. These and further objects are achieved by a method for control of data transfer in a personal area network, the data transfer being performed by Body Coupled Communication (BCC) and short-range wireless communication between a first portable electronic communication device and a second portable electronic communication device. The devices are adapted to be in close proximity to a body of a user, the method causing the first portable electronic communication device to initiate and perform execution of predefined actions. The actions comprise continuously checking, by means of the first portable electronic communication device itself, if a capacitance belongs to a predefined capacitance interval/range indicating that the first portable electronic communication device is in close proximity to the body of the user. The actions comprise triggering the first portable electronic communication device to initiate BCC by itself with the second device in response to the checked capacitance. The actions comprise sending, by means of the first portable electronic communication device itself, a BCC signal over the user's body in response to the checked capacitance comprising short-range wireless communication pairing information to the second device. The actions comprise triggering the first portable electronic communication device to prepare a short-range wireless communication by itself with the second device. The actions comprise executing the short-range wireless communication between the first and the second device if also this second device is in close proximity to the body of the same user.

According to one aspect of the disclosure, it provides a method for control of data transfer, further initiating and performing execution of predefined action complementing the step of checking capacitance. The actions comprise continuously measuring capacitance by means of the first portable electronic communication device itself.

According to a further aspect of the disclosure, it provides a method for control of data transfer, further initiating and performing execution of predefined actions comprise continuously comparing, by means of the first portable electronic communication device itself, the measured capacitance with capacitance data stored in the first portable electronic communication device, and continuously determining, by means of the first portable electronic communication device itself, if the measured capacitance belongs to a predefined capacitance range or interval indicating that the first portable electronic communication device is in close proximity to the body of the user.

According to another aspect of the disclosure, it provides a method for control of data transfer further initiating and performing execution of predefined action before the step of executing a short-range wireless communication comprising receiving, in the first portable electronic communication device, short-range wireless communication signals sent from the second communication device for initiating a short-range wireless communication between the devices.

According to yet another aspect of the disclosure, it provides a method for control of data transfer, further initiating and performing execution of predefined actions after the step of executing a short-range wireless communication comprising ending, by means of the first portable electronic communication device itself, the execution of the short-range wireless communication with the second communication device if the checked capacitance indicates that the first portable electronic communication device no longer is in close proximity to the body of the user.

According to still another aspect of the disclosure, it provides a method for control of data transfer, further initiating and performing execution of predefined action after the step of ending the execution of the short-range wireless communication comprising unpairing the first portable communication device and the second communication device.

According to yet another aspect of the disclosure, it provides a method for control of data transfer, further initiating and performing execution of predefined action in the second communication device comprising continuously checking, by means of the second device, if any BCC signals are received over the user's body from a first communication device.

The advantages of the above invention and aspects are for example the following. There is no manual interaction between the user of the portable devices and the devices themselves required, the only interaction necessary is that the user for example puts a pair of headsets over his/her ears and the sound moves from a tablet and/smartphone and/or wristlet to the headset automatically. Moreover, the manual pairing of for example a headset/visors and tablet/smartphone/wristlet prior use is eliminated. Another advantage is that the headset/visors is enable to, by itself, decide if it is located in a position where e.g. the sound/video ought to be utilized for audio or video. That is, if e.g. the headphones are placed around the neck, i.e. not in use, no connection is established with the electronic portable device playing the sound. If, on the other hand, e.g. the headset is located over the user's ears then the headset initiate a redirection of the sound from e.g. the loudspeakers of the electronic portable device to the headset. Whenever the headphones are removed from the ears, the described method makes the headphone initiate a redirection of the sound back to the loudspeakers. Furthermore, the power required for enabling and operating the method and device according to the invention is also negligible or low. The use of the invention also means that the user can take any headset or visors (that has this invention implemented) and put on his/her head and it will work, with no other interaction from the user. The invention also enables to detect when the tablet/smartphone/wristlet and the headset/visors are on the same body, and then, if there is music/sound/video playing, this data transmission is directed to the headset/visors and not to the internal speaker/display of a tablet/smartphone/wristlet without any manual pairing required by the user. Hence, the headset or visors is the autonomous master device checking that for example the tablet is on the same body, whereby there occurs no unnecessary draining of power by continuously sending BCC/BAN signals as the headset or visors is triggered and decides itself when it shall send BCC/BAN signals.

Further objects and features of the present invention will appear from the following detailed description of aspects of the invention.

BRIEF DESCRIPTION OF THE DRAWINGS

The present technique will be more readily understood through the study of the following detailed description of the embodiments/aspects together with the accompanying drawings, of which.

It should be added that the following description of the aspects/embodiments is for illustration purposes only and should not be interpreted as limiting the disclosure exclusively to these embodiments/aspects.

DETAILED DESCRIPTION

Various aspects of the invention will hereinafter be described in conjunction with the appended drawings to illustrate but not to limit the invention. Variations of the inventive aspects are not restricted to the specifically shown embodiments, but are applicable on other variations of the invention. Like designations denote like elements.

Embodiments of the present invention will be exemplified using a mobile communication device such as a mobile phone. However, it should be appreciated that the invention is as such equally applicable to electronic devices which have touch detection capabilities. Examples of such devices may for instance be any type of mobile phone, smartphone, laptop (such as standard, ultra portables, netbooks, and micro laptops) handheld computers, portable digital assistants, tablet computers, touch pads, gaming devices, accessories to mobile phones, e.g. wearables in the form of headphones/-sets, visors/goggles, bracelets, wristbands, necklaces, etc. For the sake of clarity and simplicity, the embodiments outlined in this specification are exemplified with, and related to, mobile phones, tablets, headphones and head, neck and arm wearables only.

FIGS. 1, 2, 3, 4 and 5 illustrate examples of wearable and portable electronic communication devices 1, 10, 20, 30 and FIGS. 6 to 11 discloses flowcharts illustrating the inventive method of operating these devices for data transfer in a local/body area network. The electronic device 1 comprises a central handling and processing unit 40 that may be constituted by any suitable Central Processing Unit (CPU), microcontroller, Digital Signal Processor (DSP), etc., capable of executing computer program code for evaluating and comparing signals for operation of the electronic device 1, 10, 20, 30. The electronic device 1 further comprises a memory 50 that can be used for storing computer program code, old/predefined values, e.g. capacitance values, and threshold values, e.g. threshold capacitance values etc. The memory 50 can be any combination of a Read and write Memory (RAM), and a Read Only Memory (ROM). The memory 50 may also comprise persistent storage, which, for example, can be any single one or combination of magnetic memory, optical memory, or solid state memory or even remotely mounted memory. The electronic device 1 also comprises components required for its operation, such as power supplying batteries (not shown), but these components are not explained further as this is common knowledge for a skilled person.

Figures 1, 2:
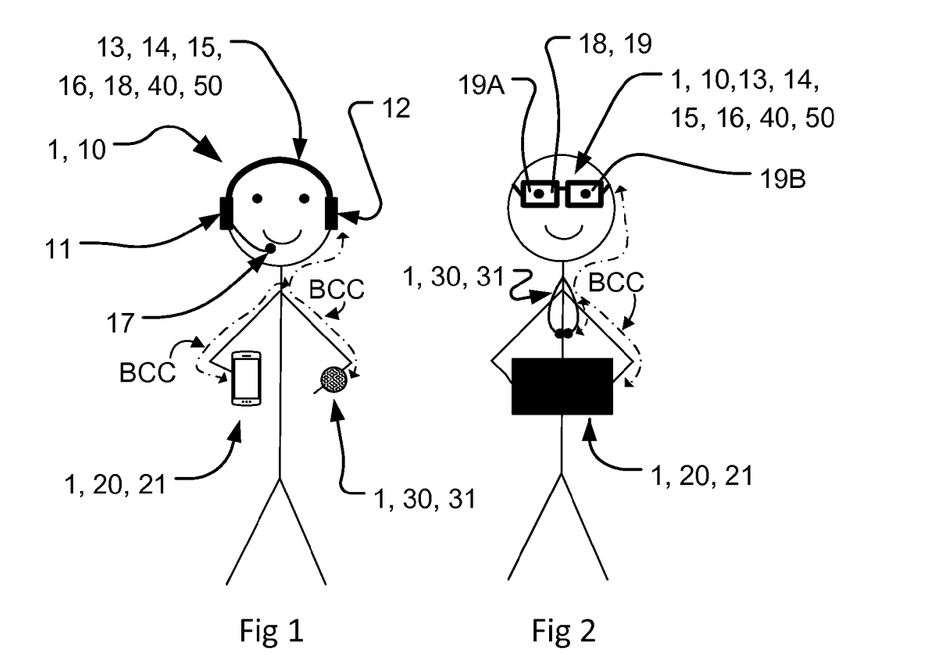
FIG. 1 illustrates a user wearing at least two portable electronic communication devices in one scenario of how the present invention can be implemented.
FIG. 2 illustrates another user wearing at least two portable electronic communication devices in another scenario of how the present invention can be implemented.

FIG. 1 shows a schematic overview of an example of a first wearable and portable electronic communication device 1 in the form of a headphone/set 10 being an implementation of the invention and put on a head of a user for operation. If not put on the head of the user, the inventive headphone/-set 10 should not be in full operation, i.e. the inventive headphone/-set 10 is in a "sleeping" mode. Thus, the headphone is only in a partial operation mode before being put on the head of a user, and is configured to be "awakened" into the full operating mode without any active input from the user, except for only the manual movement from a position in which the headphone/-set 10 is not placed on the user's head to a position where the headphone/-set 10 is placed on the head, as soon as it is put on the head of the user. Hence, once put on the head, the inventive headphone/-set 10 recognizes this, i.e. by detection of the user's head affecting capacitance measured by the headphone/-set 10 itself without any manual starting of it to get the headphone/-set 10 into the full operational mode according to the inventive method. This headphone/-set 10 starts up and begins to operate according to the inventive method. This device 10 works in accordance with the method of the invention, which will be explained in more detail below. In this example, the headphone/-set 10 is a stereo headphone/-set by being equipped with at least two speakers 11, 12. However, as is readily understood by a skilled person, the headphone/-set may also be a mono headphone/-set provided with only one speaker 11. One speaker may be provided close to a body of a user, i.e. a head of a user, e.g. a left ear of a user and the other speaker may be provided close to a right ear of the user at appropriate hearing distance.

FIG. 2 shows a schematic overview of another example of a first wearable and portable electronic communication device 1 in the form of visors/goggles 10 being an implementation of the invention and put on a head of a user for operation. If not put on the head, the inventive visors/goggles 10 should not be in full operation, i.e. the inventive visors/goggles 10 is in a "sleeping" mode. Thus, the visors/googles are only in a partial operation mode before being put on the head of a user, and is configured to be "awakened" into the full operating mode without any active input from the user, except for only the manual movement from a position in which the visors/goggles 10 is not placed on the user's head to a position where the visors/goggles is placed on the head, as soon as it is put on the head of the user. Hence, once put on the head, the inventive visors/goggles 10 recognize this, i.e. by detection of the user's head affecting capacitance measured by the visors/goggles 10 by itself without any manual starting of it to get the visors/goggles into the full operational mode according to the inventive method. The visors/goggles 10 start up and begin to operate according to the inventive method explained below and illustrated in FIGS. 6 to 11. This inventive device 10 works in accordance with the method of the invention, which will be explained in more detail below. In this example, the visors/goggles 10 are equipped with at least one display 19. However, as is readily understood by a skilled person, the visors/goggles may also be provided with more displays 19, e.g. one display 19A, 19B for each separate spectacle or monocle. Hence, one display 19, 19A may be provided close to a left eye of a user and the other display 19, 19B may be provided close to a right eye of the user at appropriate seeing distance. The visors may be provided with at least one microphone 17 and/or at least one speaker 11, 12 similar to the headset of FIG. 1, even though the microphone and speakers are not shown in FIG. 2, the visors may be a combined audio and video handling portable device.

The values of the memory 50 for determining if the first wearable and portable electronic communication device 1 in the form of headsets/visors/goggles 10 is put on a head of a user for operation or not and the memory itself are stored and arranged in or on the first wearable and portable electronic communication device 1 in the form of headsets/visors/goggles 10 itself.

Figure 5:
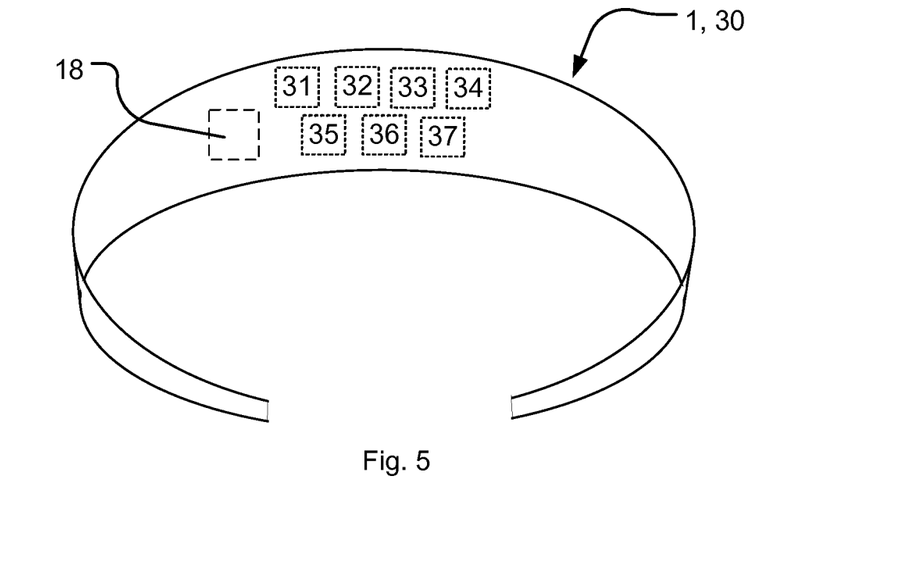
FIG. 5 illustrates yet another example of a wearable mobile electronic communication device embodying a third implementation of the invention.
Figure 6:
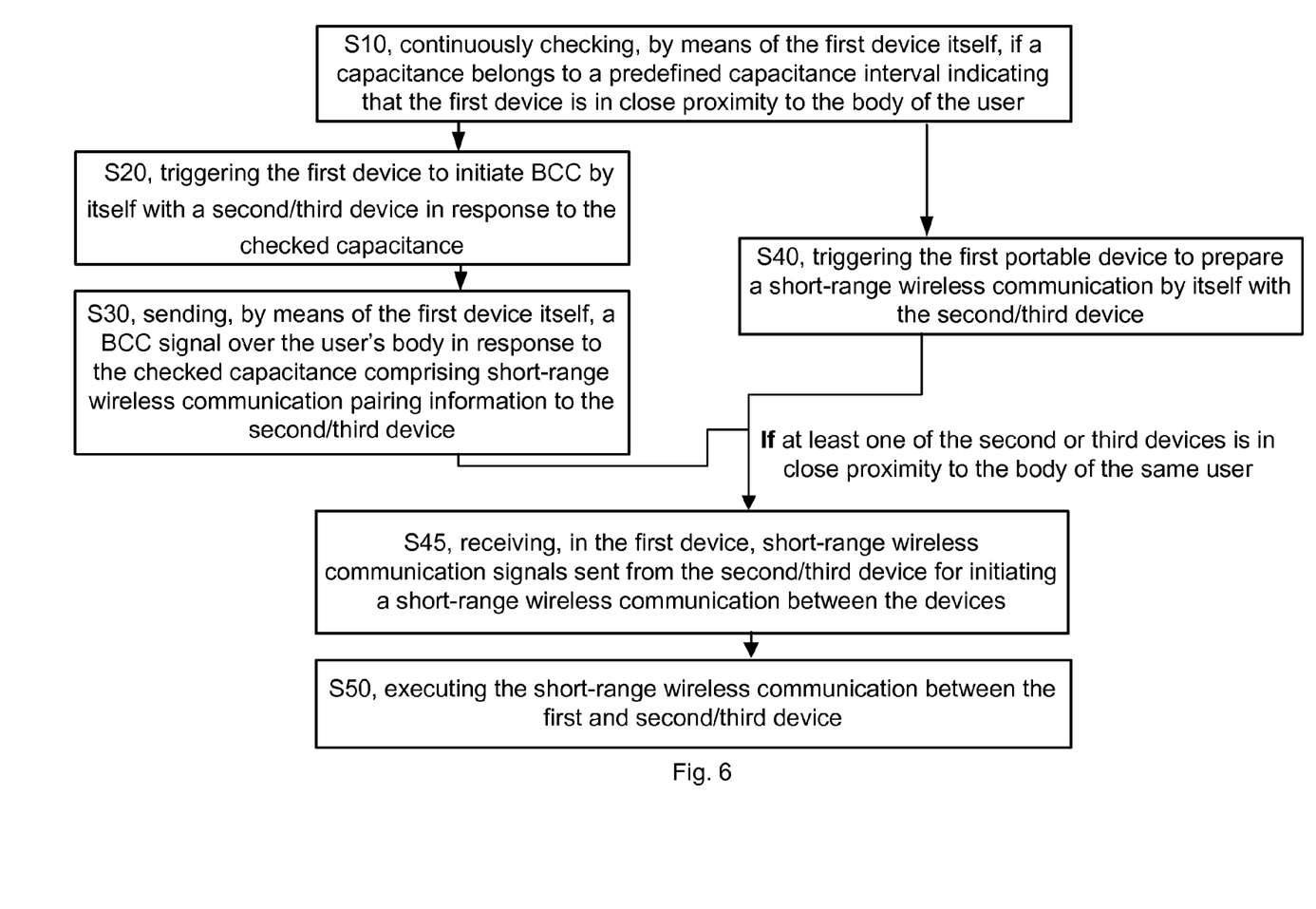
FIG. 6 illustrates a flowchart of a method for controlling data transfer between portable electronic communication devices according to the invention.

In FIG. 1, there is also schematically shown an example of a third wearable/portable electronic communication device 1, in addition to the two the required two electronic communication devices 1, 10, 20, in the form of a bracelet or wristband 30, which is shown in more detail in FIG. 5. The user could of course wear or hold more than three devices totally, e.g. a headset or visors 10, a wristband 30, a necklace 30, chest band (not depicted) and a smart phone or tablet 20.

The first communication device 10 may be a headphone, headset, visors or goggles or a combination of such wearables, e.g. a headset 10 with one or more spectacles working as displays 19, 19A, 19B, or goggles/visors 10 with a microphone 17 and/or speakers 11, 12.

The inventors have realised that Body-Based/-coupled Communication (BBC/BCC) can be utilized to determine if a first head wearable communication device 10 and another portable electrical communication device 20, 30, which the user holds in her/his hand and/or in her/his lap and/or wears around the neck and/or arm/wrist, that are to be connected in order to establish an audio and/or video communication, belongs and are in close proximity to/in contact with the same user. The inventive device 10, e.g. headphones, utilizes BCC to conclude, by itself/themselves, if the other electrical device 20, 30 is in contact with the same human body as the headphones are. Moreover, these devices 10, 20, 30 are all equipped with antennas 13, 21, 31 adapted for BCC. However, the antenna 13 of the inventive first device 10 is also equipped with capacitance measurement circuitry, where the capacitance values are utilized to determine if the first device 10, such as headset or visors, is located on the user's head or not, before establishing and executing a wireless data transfer between the first inventive device 10 and at least one other device 20, 30.

The antenna 13 of the inventive first device 10 does not have to be in contact with the skin of the body of the user for enabling the operation and measurement of capacitance in its close surrounding. The capacitance measurement circuitry operatively connected to the antenna 13 is tuned in for each first device 10 as the associated capacitance measurement functionality depends on the size and the location of the antenna 13 in the device 10. Hence, the tuning may be done so that a distance between the antenna 13 and the body and/or head of the user may range from about 2 mm to 2 cm.

Body-Coupled Communications (BCC), also referred to as Body-Based Communication (BBC) or Near-Body Communication (NBC), has been proposed as a promising alternative to radio frequency (RF) communication as a basis for Body/Personal Area Network (BAN/PAN) communication. BCC allows for an exchange of information between a plurality of devices which are in contact with or in close proximity of a living body. This can be achieved by the transmitting BCC-/BAN-antenna that provides a capacitive or galvanic coupling of low-energy electrical fields onto the body surface, i.e. leakage currents with a small magnitude is set to spread out over the human body. The small currents are then detected by a receiver BCC-/BAN-antenna 13, located on the same body. Thus, signals are conveyed over the body instead of through the air. As such, the communication is confined to the volume close to the body in contrast to RF communications, where a much larger volume is covered. Therefore, communication is possible between devices situated on, connected to, or placed close to the body. The power consumption of BCC-/BAN-antennas is very low, i.e. negligible, which means that the BCC antennas can be turned on the entire time.

BCC/BBC is no new technique, and it has previously been employed within the fields of e.g. medical sensor devices and exercise sensors. Within these fields, sensors attached to the users skin or worn in the close proximity of the body is employed for monitoring different body functions in order to keep track of medical status or fitness parameters of the user. To send the collected data to a central unit e.g. BCC/BBC can be utilized.

In one aspect of the invention, the first wearable and portable electronic communication device 1 comprises at least one sensor or electrode or antenna 13 adapted for BCC, see FIGS. 1 and 2. The first portable electronic communication device 1 comprises at least one controller unit 14. The first wearable and portable electronic communication device 1 may also comprise a wireless communication interface and circuitry 15 configured for handling radio signals sent via air.

The first communication device 1 may also comprise a communication interface and circuitry 16 for BCC.

The first wearable electronic communication device 1 in the form of a headphone/-set 10 may be provided with at least one microphone 17 and would then more specifically be a headset 10 with an audio capturing and transmitting function and not only a headphone with only an audio receiving and transmitting function. In one example, shown in FIG. 1, the microphone 17 is attached to the headset 10 in such a way that the microphone is suitably arranged for audio capturing, e.g. voice capturing, i.e. near the mouth of the user. The antenna 13 is capable of sending and sensing signals conveyed over the body of a user of the headset 10 instead of through the air by means of capacitive or galvanic coupling of low-energy electrical fields onto the body surface of the user. Such BCC, also known as body-based or near-body communication, is an alternative or complement to radio frequency (RF) communication, e.g. short-range wireless communication between mobile electronic communication devices.

The first wearable and portable electronic communication device 1 in the form of a headphone/-set or visors 10 also comprises necessary components and circuitry, e.g. controllers, transmitters, memories, interfaces, power supplies, and antennas and so on, to enable the wireless communication circuitry 15 to perform, as sender and receiver, short-range wireless communication through the air instead of using the "body wiring", e.g. by using radio frequencies (RF) suitable for air transmission, e.g. Bluetooth™ (BT), with at least one other wearable and portable electronic device 20, 30. The first, second and any third wearable and portable electronic communication device 1, 10, 20, 30 may also comprise necessary components and circuitry 18 for short range wireless communication referred to as Near Field Communication (NFC). The use of and required equipment and components 15 and 18 for enabling RF, BT and NFC communication in the first, second and third mobile electronic communication devices 1, 10, 20, 30 will not be explained in detail below as this is common knowledge for the skilled person.

Other suitable examples of the wearable mobile electronic device 1, i.e. wearables 10, 20, 30, are portable speakers that may be integrated in such a device 1 or be detachably plugged into the device 1.

FIG. 5 shows a schematic overview of an example of another wearable electronic communication device 30. In this example, the third device 30 is a wrist band, sometimes also referred to as a wristlet, bracelet, chest band or necklace, intended for a user to wear around the wrist of the arm or the neck. In one aspect of the invention, the third device 30 may comprise at least one sensor 31, at least one controller unit 32, communication means 33, 37, e.g. suitable for short-range wireless communication through the air instead of using the "body wiring", e.g. by using radio frequencies (RF) suitable for air transmission, e.g. Bluetooth™ (BT), at least one microphone 34 similar to the headset 10 above, at least one memory 35, and, optionally, at least one display 36. In one example, as shown in FIG. 5, the microphone is placed in the wearable device 30, thus it is an internal microphone. In another example, the microphone is placed outside the wearable device (not shown), thus it is an external microphone. The sensor 31 is capable of sending and sensing signals of body coupled communication in a similar way as the antenna 13 of the first portable electronic communication device 1, 10, e.g. the headset/visors 10.

Figure 3:
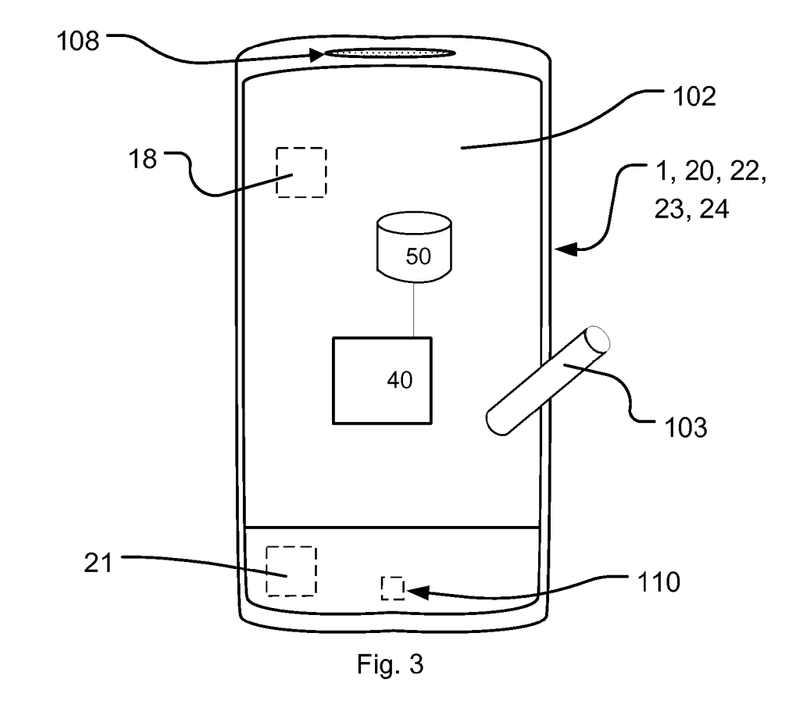
FIG. 3 illustrates an example of a wearable mobile electronic communication device embodying a first implementation of the invention.
Figure 4:
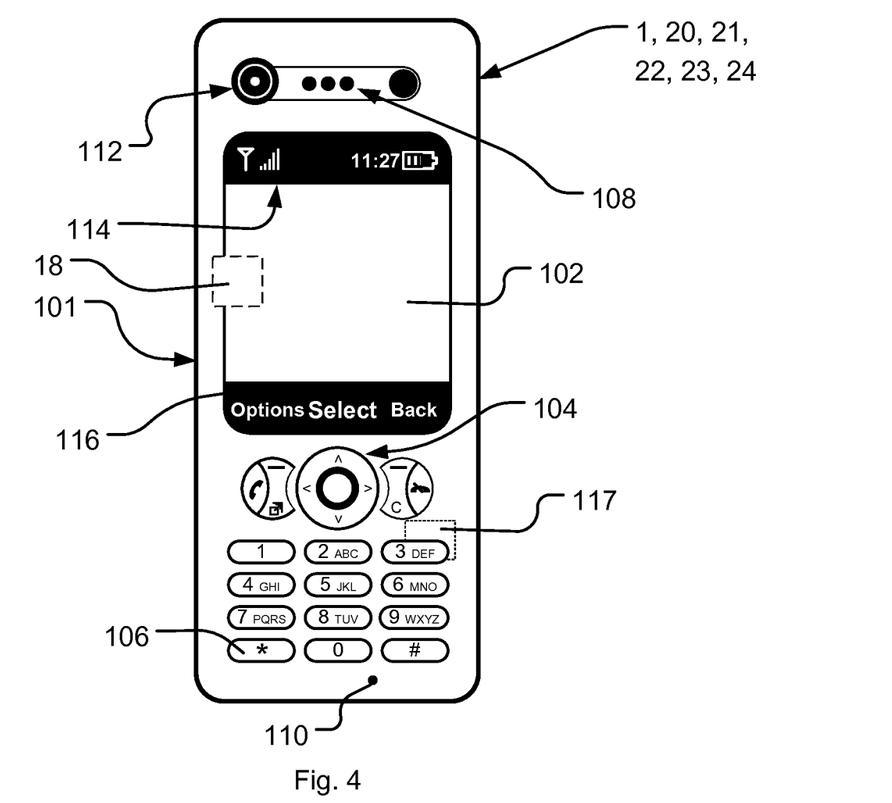
FIG. 4 illustrates another example of a wearable mobile electronic communication device embodying a second implementation of the invention.

FIGS. 1, 2, 3 and 4 show exemplary portable electronic communication devices 1, e.g. mobile telephones 1, tablets 20 or wearables 30. In FIGS. 3 and 4, a portable electronic communication device 1, 20 in the form of a mobile phone or a tablet is shown, according to embodiments of the present invention, comprising a casing 101, a display area 102 and means 104 for navigating among items (not shown) displayed in the display area. The display area 102 may comprise a status indication area 114 and one or more softkey bars 116. The status indication area 114 may for example include symbols for indicating battery status, reception quality, speaker on/off, present mode, time and date, etc. The status indication section is not in any way limited to include the symbols and the functions presented herein. The softkey bar 116 is operable using the navigation means 104, as disclosed in FIG. 4, or, if using a touch sensitive screen, e.g. a capacitive display, as disclosed in FIG. 3, by tapping a softkey icon directly with a pen-like object 103, a finger, or other body part. The functions of the softkeys are not limited by the functions indicated in the figure. Neither are the placements of the softkey bar 116 and the status indication area 114 limited to be placed at the bottom and the top of the screen, as shown in the example. The navigation means 104 can be a set of buttons, a rotating input, a joystick, a touch pad, a multidirectional button, but can also be implemented using a touch sensitive display 102 as shown in FIGS. 3 and 4, wherein the displayed items directly can be tapped by a user for selection, or be voice activated via a headset or a built-in microphone. The mobile communication device 1 can also comprise other elements normally present in such a device, such as a keypad 106, a speaker 108, a microphone 110, a camera 112, a processor 40, a memory 50, one or more accelerometers (not shown), a vibration device (not shown), an AM/FM radio transmitter and receiver (not shown), a digital audio broadcast transmitter and receiver (not shown), a card reader 117 for smart cards, e.g. SIM and/or memory cards, etc. Each of the portable electronic devices 1, 20, 30 also comprises power supplies, such as at least one battery (not shown) for its operation.

The system, device 10 and method according to the invention as implemented in portable electronic communication devices 1 or being such a device in itself is preferably intended for the usage together with a portable wearable 10, 20, 30 as above. The first portable electronic communication device 1 may be any portable electronic device such as, e.g. a headphone 10, a headset 10, visors 10, goggles 10 with or without a display 19, 19A, 19B or any suitable picture or movie projector. The portable electronic communication device 1, 10, 20, 30 is configured to be in close proximity to and/or in contact with the same body of a user for ensuring the functionality of BCC communication and associated BCC signals transmitted and received by itself and between itself and any other portable electronic communication device on the same body.

Moreover, a second portable electronic communication device 1 may be any portable electronic device such as, e.g. a mobile radio terminal 20, a mobile telephone 20, a cellular telephone 20, a pager, a communicator, a smart phone 20, a Personal Digital Assistant (PDA) 20, an electronic organizer, a computer, a digital audio player such as a MP3-player or an iPod®, or a tablet/media plate (e.g. iPad®) 20, a digital camera, or any suitable picture or movie projector being in close proximity to and/or in contact with the same body of a user as the wearable 10 for ensuring the functionality of the BCC communication and the associated BCC signals according to the invention between the two devices 20 and 10.

Furthermore, the user may also wear the third portable electronic device 1 being any portable electronic device such as, e.g. a wristlet 30, a bracelet 30, a watchstrap/-band 30, chest band 30, wristwatch 30, necklace 30 with or without a display 36 or any suitable picture or movie projector being in close proximity to and/or in contact with the same body of a user as the head wearable 10 and/or the second portable electronic communication device 1, 20 for ensuring the functionality of the BCC communication according to the invention between the three devices 1, 10, 20 and 30. Preferably, the second and/or third portable electronic communication device 20, 30 should be in contact with the same body of a user as the wearable 10 for ensuring the functionality of the BCC communication.

One function of the first device 1, 10 according to one aspect of the invention is achieved by the control unit 14 being configured to cause the first portable device 10 to transmit audio signals to the speaker 11 and/or 12 in response to the short-range wireless communication signals from the second communication device 1, 20, 30.

Another function of the first portable device 10 according to another aspect of the invention is achieved by the control unit 14 being configured to cause the first portable device 10 to transmit audio signals generated by voice capturing of the microphone 17 in the first portable device by means of the control unit 14 to the second communication device 1, 20 or the third device 1, 30.

Yet another function of the first portable electronic communication device 1, 10 according to still another aspect of the invention is achieved by the control unit 14 being configured to receive and transmit video signals to a display 19, 19A, 19B of the first portable electronic communication device in response to the short-range wireless communication signals from the second communication device 1, 20 or the third communication device 1, 30. However, the above functions could be performed the other way around, i.e. any control unit of the second communication device 1, 20 and/or the third communication device 1, 30 could be configured to receive and transmit video signals to a display 19, 19A, 19B of the first, the second and/or the third portable electronic communication device 1, 10, 20, 30 in response to the short-range wireless communication signals from the first and/or the third communication device 1, 10, 30 or even the second communication device 1, 20.

The first portable electronic communication device 10 may further comprise processing means (not shown) adapted for performing audio/video signal and audio/voice sampling and processing in response to the voice from the user or the signals in response to the short-range wireless communication signals from the second communication device 1, 20 or the third communication device 1, 30. The first portable electronic communication device 10 may further comprise a memory/database (not shown) comprising at least the predefined capacitance being checked via the sensor 13 of the first portable electronic communication device 10. The first portable electronic communication device 10 may further comprise a comparator (not shown) adapted for comparing the constantly measured capacitance via the sensor 13 of the first portable electronic communication device 10 with the predefined capacitance being stored in the database/memory (not shown).

The second portable electronic communication device 1, 20 comprises the sensor/antenna 21 and the third portable electronic communication device 1, 30 comprises the sensor/antenna 31, which antennas 21 and 31 are configured for BCC similar to the antenna 13 of the first portable electronic communication device 10 except for the inventive capacitance measuring capability of the circuitry of the antenna 13 of the inventive first device 10. The second portable electronic communication device 1, 20 may comprise a communication interface 22 for short-range wireless communication, e.g. via BT, with the first and/or the third portable electronic communication device 1, 10, 30. The second portable electronic communication device 1, 20 may comprise a communication interface 23 for BCC with the first and/or the third portable electronic communication device 1, 10, 30.

The first portable electronic communication device 10 may comprise a communication interface 15 for short-range wireless communication, e.g. via BT, with the second and/or third portable electronic communication device 1, 20, 30. The first portable electronic communication device 10 may comprises a communication interface 16 for BCC with the second and/or third portable electronic communication device 1, 30.

The third communication device 1, 30 may comprise a communication interface 33 for short-range wireless communication, e.g. via BT, with the second and/or first communication device 1, 10, 20. The third communication device 1, 30 may comprise a communication interface 37 for BCC with the second and/or first communication device 1, 10, 20.

The second portable communication device 1, 20 may comprise a control unit with associated processing circuitry 24 for control of the communication of the second device 1, 20. The third device 1, 30 may comprise a control unit with associated processing circuitry 32 for control of the communication of this third wearable device 1, 30.

The above mobile devices 1, 10, 20, 30 may form a system of devices configured to cooperate by means of BCC and short-range wireless communication via BT (see FIGS. 1 to 6). The system's primary function is controlled by the inventive first communication device 10 for wearing on a user's head that by means of its control unit 14 and antenna 13 initiates and performs, by itself, at least the following actions according to the invention; i.e. firstly continuously checking in a step S10, by means of the first communication device 10 itself, if a capacitance belongs to a predefined capacitance interval or range indicating that the first communication device 10 is in close proximity to the head or other body part of the user or even in contact with the user's body. The control unit 14 of the first communication device is triggered in a step S20 to initiate BCC by the first device 10 itself via its antenna 13 with the second and/or third device 20, 30 in response to the checked capacitance. The control unit 14 sends, in a step S30, via the BCC antenna 13 of the first device 10 itself, a BCC signal over the user's body in response to the checked capacitance comprising short-range wireless communication pairing information to the second and/or third device 20, 30. The control unit 14 of the first head wearable device 10 is triggered in a step S40 to prepare/set up a short-range wireless communication by itself with the second and/or third device 20, 30. Then, if at least one of the second or third devices is in close proximity to the body of the same user or in contact with body of the user, the first device receives, in step S45, short-range wireless communication signals sent from the second and/or third device 20, 30. In a step S50 the first communication device 10 itself or the second and/or third device 20, 30 execute the short-range wireless communication between the first communication device 10 and the second and/or the third device 20, 30. However, the most frequent BAN system only connects two devices, i.e. the first device 10 connects only with the second device 20 or only with the third arm/wrist wearable device 30. In other BANs, more than two devices may be connected and transfer data between each other to establish a BAN in accordance with the invention.

The control unit 14 with associated processing circuitry is configured for control of the BCC and the short-range wireless communication with the second and/or the third communication device 20, 30 for causing the first device 10 to initiate and perform execution of predefined actions comprising: continuously checking in the step S10. This means that the first device 10 in fact has its own control unit 14 making this first head wearable communication device 10 able to operate autonomously, i.e. this first device 10 may in itself check if it is put on a user's head or not and if it is supposed to wake-up and start initiation and establishment and operation of a BAN according to the invention without the user actively and manually setting up the BAN. This is done by checking, in step S10, if a capacitance belongs to a predefined capacitance interval/range indicating that the first communication device 10 is in close proximity to the body and/or head of the user, or even in contact with the body and/or head of the user.

In the step S20, the control unit 14 of the first head wearable device 10 is triggered to initiate BCC by itself via the BCC antenna 13 with the second or third device 20, 30 in response to the checked capacitance. In the step S30, by means of the control unit 14 via the BCC antenna 13 of the first device 10 itself, at least one BCC signal is sent over the user's body in response to the checked capacitance comprising pairing information to be able to establish a short-range wireless communication with the second and/or the third device 20, 30. The control unit 14 of the first device 10 is triggered in the step S40 to prepare a short-range wireless communication, e.g. via BT, by itself with the second and/or the third device 20, 30. The short-range wireless communication between the first and the second and/or the third device 10, 20, 30 is executed in the step S50 if also this second and/or third device is in close proximity to the body and/or head of the same user, or even in contact with the body and/or head and/or arm/wrist of the same user. The above steps S10, S20, S30, S40, and S50 are shown in FIGS. 6, and 8 to 12.

Figure 8:
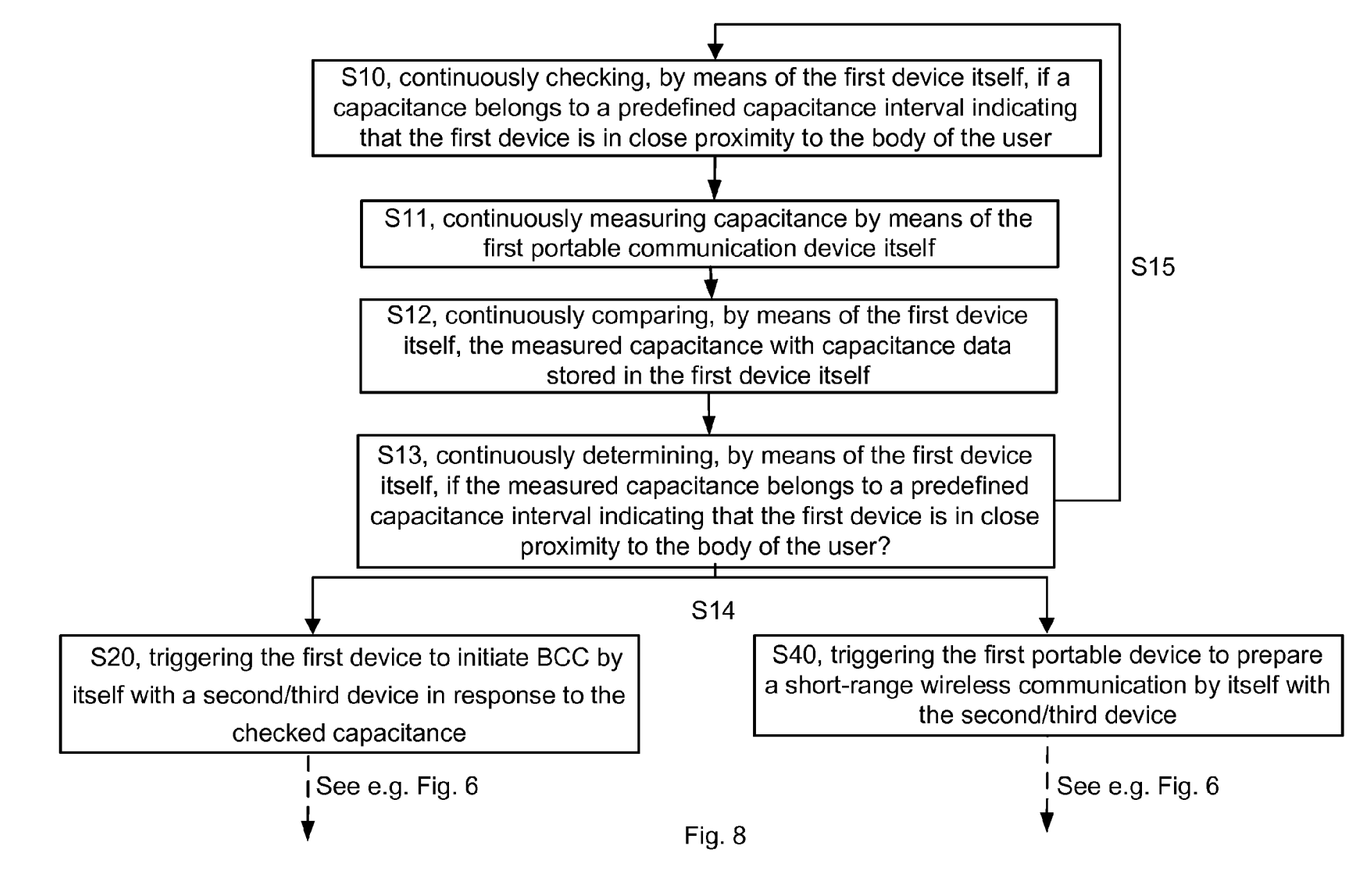
FIG. 8 illustrates a flowchart of another aspect of the method for controlling data transfer between portable electronic communication devices according to the invention.

In one aspect of the invention, the control unit 14 is configured to cause the first communication device 10 to measure, by itself, continuously in a step S11 capacitance by means of its BCC antenna 13, see FIG. 8.

According to another aspect of the invention, the control unit 14 is configured to cause the first communication device 10 to, by itself, continuously compare, in a step S12, the measured capacitance of its BCC antenna 13 with capacitance data stored in the first communication device 10 itself, see FIG. 8. This storage of capacitance data may be done in memory/database 50 of this first device 10.

According to yet another aspect of the invention, the control unit 14 of the first communication device 10 is configured to continuously determine in a step S13, as shown in FIG. 8, by itself, if the measured capacitance of its BCC antenna 13 belongs to a predefined capacitance range/interval indicating that the first communication device is in close proximity to the body of the user and/or the head of the user, or even in contact with the body and/or the head of the user.

Figure 7:
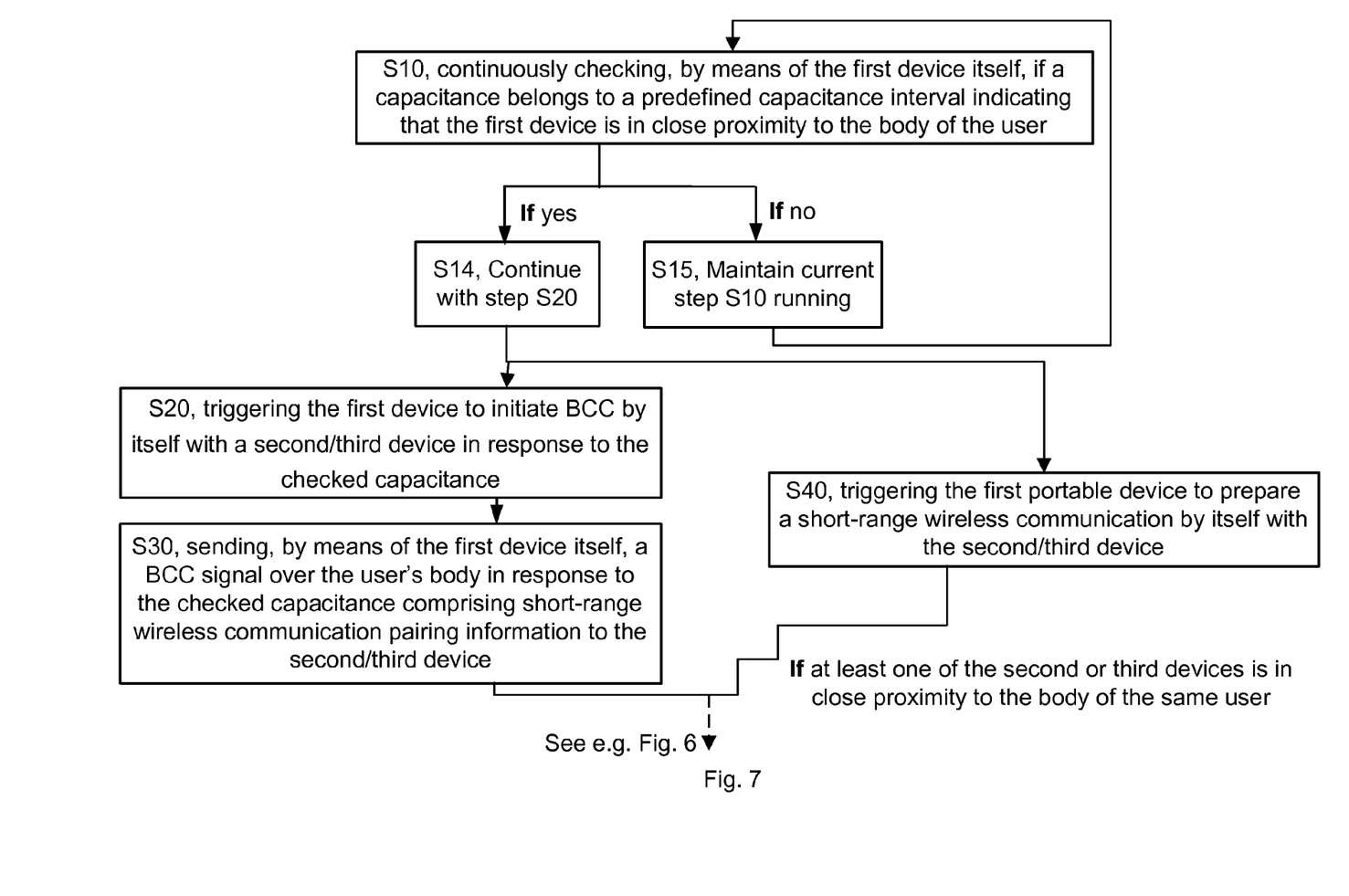
FIG. 7 illustrates a flowchart of an aspect of the method for controlling the data transfer between portable electronic communication devices according to the invention.

According to another aspect of the invention, the control unit 14 of the first device 10 is configured to check, in the step S10, and to determine to continue with step S20, in a step S14 shown in FIG. 7, if the checked capacitance belongs to a predefined capacitance interval/range indicating that the first device is in close proximity to or in contact with the body of the user, or to maintain the current step S10 running/operating, in a step S15 shown in FIG. 7, if the checked capacitance do not belong to a predefined capacitance interval/range indicating that the first device is not in close proximity to or in contact with the body of the user.

Moreover, as shown in FIG. 7, if step S20 is to be continued, i.e. if it is confirmed that the capacitance checked by the first device 10 itself belongs to a predefined capacitance interval/range indicating that the first device is in close proximity to or in contact with the body of the user, also the subsequent steps of at least S30 to S50 is performed thereafter. Accordingly, also steps S45, S60 and S70 are performed if appropriate.

Figure 9:
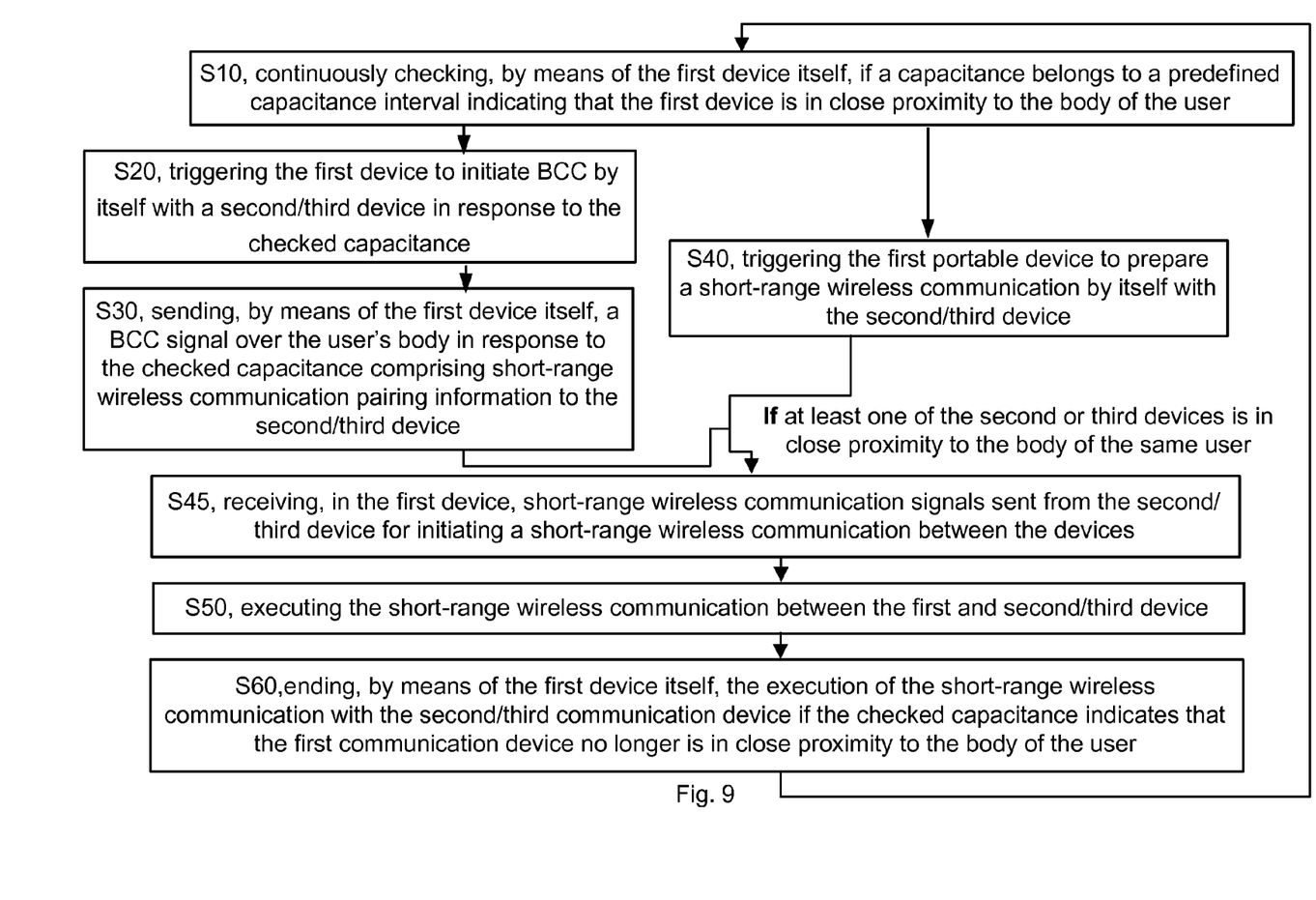
FIG. 9 illustrates a flowchart of yet another aspect of the method for controlling data transfer between portable electronic communication devices according to the invention.

In still another aspect of the invention, the control unit 14 of the first device 10 is configured to control short-range wireless communication signals sent from the second and/or third device 20, 30 and received in step S45, see FIG. 9, in the first device 10 for initiating a short-range wireless communication between these devices. Then, after step S45, the control unit 14 initiates step S50.

Figure 10:
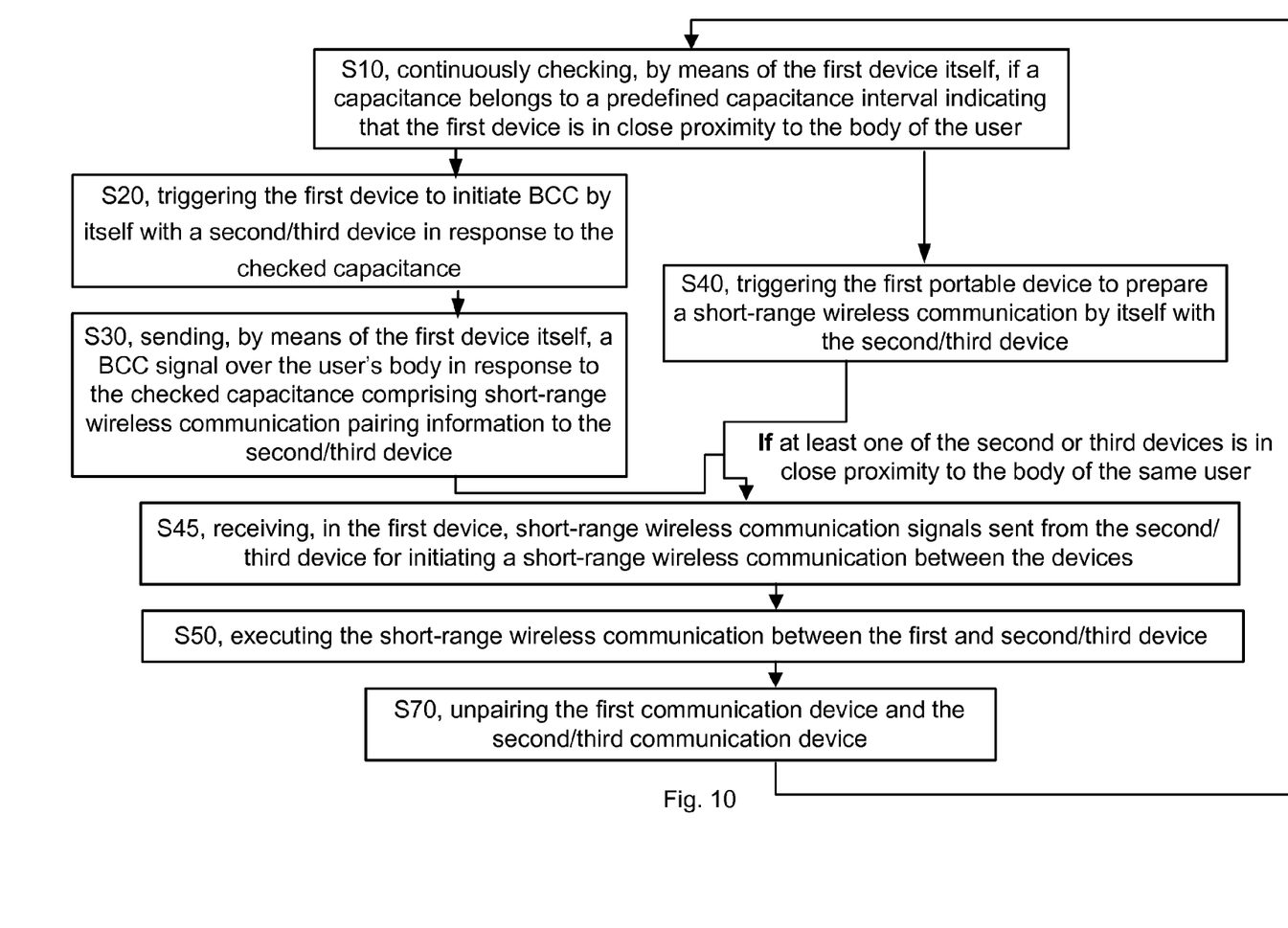
FIG. 10 illustrates a flowchart of still another aspect of the method for controlling data transfer between portable electronic communication devices according to the invention.

The control unit 14 of the first device 10, in another aspect of the invention as shown in FIG. 9, is configured to end, in a step S60, the execution of the short-range wireless communication of step S50 with the second and/or the third device 20, 30, by means of the first device and its control unit 14 and associated components itself, if the checked capacitance of the BCC antenna 13 indicates that the first portable device no longer is in close proximity to the body of the user and/or the head of the user, or even in contact with the body and/or the head of the user. According to an aspect of the invention as shown in FIG. 10, the control unit 14 is configured to unpair, in a step S70, the first device 10 and the second and/or third device 20, 30.

Figure 11:
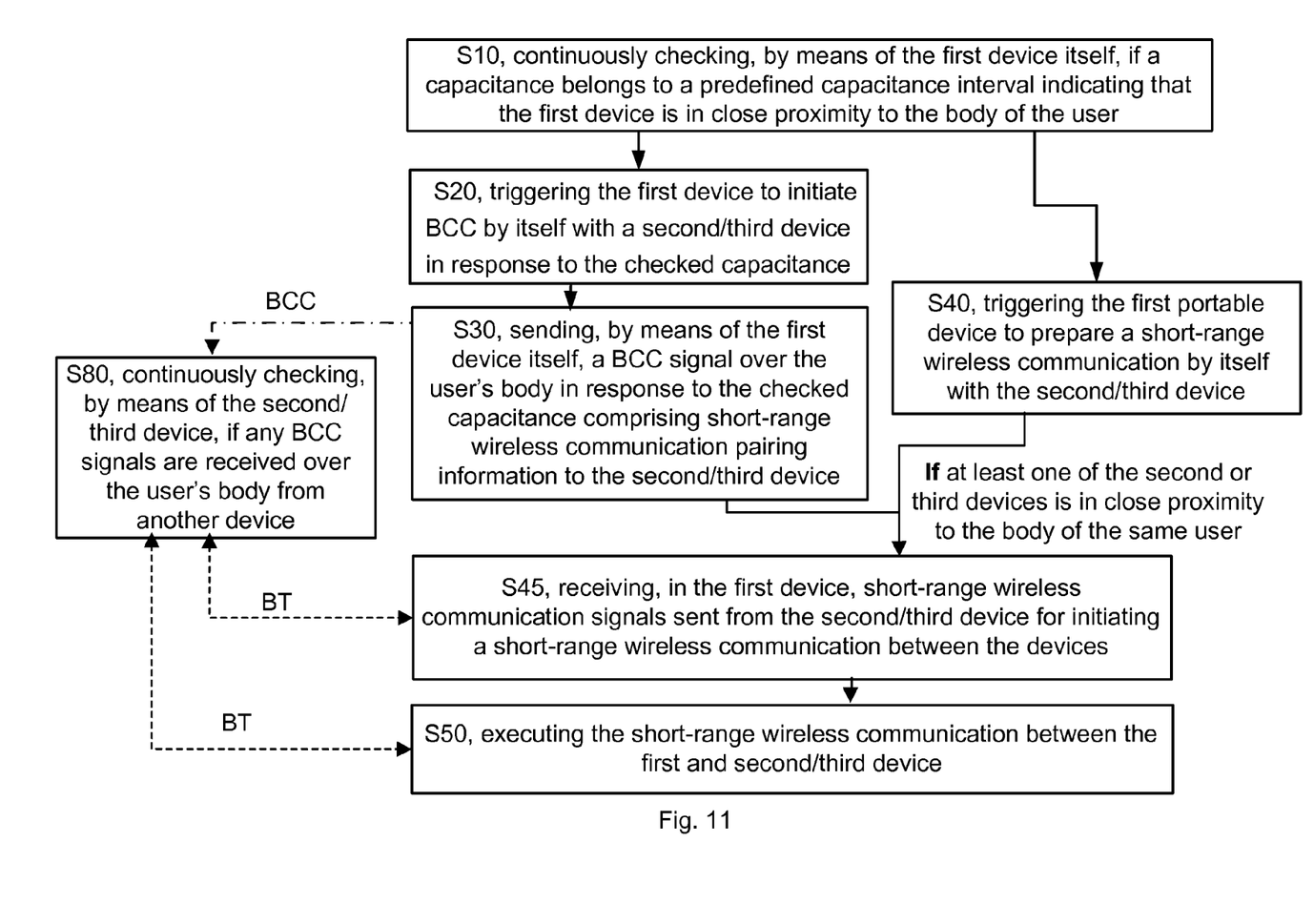
FIG. 11 illustrates a flowchart of one more aspect of the method for controlling data transfer between portable electronic communication devices according to the invention.

The method for control of data transfer according to the invention may further mean that the second and/or third communication device 20, 30 also initiate and perform execution of predefined actions in parallel and/or separately and independently from the operation and functioning of the first head wearable device 10. The first device 10 may perform more actions/functions than the following ones. The second and/or third communication device 20, 30 may continuously check, in a step S80 as shown in FIG. 11, by means of their associated control units 24 and 32 with associated processing circuitry and their BCC antennas 21 and 31, if any BCC signals are received over the user's body from the first device 10 and/or the other device 20 or 30. Preferably, this constant check by the devices 10, 20, 30 is performed so that the BAN may be initiated and setup quickly to start any communication between the devices making the operation and handling of the devices very easy for a user. The dash dotted line with two arrows in the lowest part of FIG. 11 is denoted with BT meaning that this is an example of wireless communication between the first communication device 10 and the second/third device 20, 30 and not communication in only one direction from one device to the other. However, this wireless communication may of course be a one-way communication, but is preferably a two-way communication. The dot and dashed line to the right in FIG. 11 with one arrow in the direction from step S30 to step S80 means that the BCC signal is sent in only one direction, i.e. from the first device 10 to the second/third device 20, 30. However, one or more BCC signals may be sent. Moreover, one or more BCC signals may be sent between two or more devices 10, 20, 30 in a two-way direction.

The first device 10 maintains/keeps the operation mode in step S10 as long as the first device 10 has power, i.e. this step S10 is in fact a constant mode working and running in the background during the use of the first communication device 10, but also when this first device 1 is not in use, e.g. when stored in a bag or purse or the like in a standby mode and not put on the head of the user, according to the invention as long as enough power exist. Hence, also steps S11, S12, S13, S14, and S15 are continuously operating to check that the first communication device 10 in fact is in place on the head of a user and under proper use, e.g. by receiving and sending audio signals to its speakers 11, 12 and/or any display 19, 19A, 19B for sound to be heard by the user and/or video for the user to see.

In case the second/third device 20, 30 is not prepared or sending any data in the form of audio/video signals, the second/third device 20, 30 may redirect signals from an earlier used interface to the headset/visor 10 etc. This could be done before the second/third device replies to any BCC signals from the first device 10. It may also be performed after any response to the BCC signal but before the BT channel is established. Alternatively, it may be performed in the last step. This could also be combined with a subsequent disconnection of the communication if there are no signals to transmit or redirect. However, if no music and/or video player is active in the second/third device 20, 30, no music and/or video is of course sent to the first device 10.

If a BCC signal is sent by the first device 10 but no subsequent signals are received back from the second/third device 20, 30, a loop back to the earlier step S10 may be used, if the headset/visors is in place on the head of the user but the second/third device 20, 30 is not in close proximity to the body of the user or the second/third device 20, 30 has no signals to send.

Furthermore, the steps S20 (triggering the first device 10 to initiate BCC by itself), S30 (sending a BCC signal over the user's body) and S40 (triggering the first device 10 to prepare a short-range wireless communication by itself with the second/third device) are shown in FIGS. 6 to 11 as occurring in parallel or simultaneously, but may also occur differently in time, e.g. step S40 may occur before step S20, at least shortly before. Step S40 may occur before step S30, at least shortly before. Step S40 may also occur after step S20 and/or S30, at least shortly after. Steps S20 and/or S30 may also both occur before step S40. Steps S20 and/or S30 may also occur after step S40, either separately or may both steps S20 and S30 occur after step S40.

The invention claimed is:

1. A first portable electronic communication device for cooperating with a second portable electronic communication device via Body Coupled Communication (BCC) and short-range wireless communication, the two devices configured to be in close proximity to a user's body during use, wherein this first portable electronic communication device comprises:
   a BCC antenna in the first portable electronic communication device to conduct body coupled communication with the second portable electronic communication device and to measure capacitance between the antenna and the user; and
   a control unit with associated processing circuitry configured for control of BCC and short-range wireless communication with the second portable electronic communication device, the control unit causing the first portable electronic communication device to autonomously initiate and perform execution of predefined actions comprising:
      continuously checking, by means of the first portable electronic communication device itself, if a capacitance between the BCC antenna and the user belongs to a predefined capacitance interval indicating that the first portable electronic communication device is in close proximity to the body of the user, the predefined capacitance interval stored in a memory of the first portable electronic device;
      triggering the control unit of the first portable electronic communication device to initiate BCC by itself via the BCC antenna with the second portable electronic communication device in response to the checked capacitance belonging to the predefined capacitance interval;
      sending, by means of the control unit via the BCC antenna of the first portable electronic communication device itself, a BCC signal over the user's body in response to the checked capacitance belonging to the predefined capacitance interval, the BCC signal comprising short-range wireless communication pairing information to the second portable electronic communication device;
      triggering the control unit of the first portable electronic communication device to prepare a short-range wireless communication by itself with the second portable electronic communication device; and
      executing the short-range wireless communication between the first and the second portable electronic communication devices if the second portable electronic communication device also is in close proximity to the body of the same user.

2. A first portable electronic communication device according to claim 1, wherein the control unit of the first portable communication device is configured to control short-range wireless communication signals sent from the second portable electronic communication device and received in the first portable communication device for initiating a short-range wireless communication between the devices.

3. A first portable electronic communication device according to claim 1,
   wherein the control unit of the first portable electronic communication device is configured to end the execution of the short-range wireless communication with the second portable electronic communication device, by means of the first portable electronic communication device itself, if the checked capacitance of the BCC antenna of the first portable electronic communication device indicates that the first portable device no longer is in close proximity to the body of the user.

4. A first portable electronic communication device according to claim 1, wherein the control unit is configured to unpair the first portable electronic communication device and the second portable electronic communication device.

5. A first portable electronic communication device according to claim 1, wherein the first portable electronic communication device is a headphone, headset, visor, goggles or a combination of wearables.

6. A method for control of data transfer in a personal area network, the data transfer performed by Body Coupled Communication (BCC) and short-range wireless communication between a first portable electronic communication device and a second portable electronic communication device, the devices adapted to be in close proximity to a body of a user, the method comprising the first portable electronic communication device autonomously initiating and performing predefined actions comprising:
   continuously checking, by means of the first portable electronic communication device itself, if a capacitance between the first portable electronic device and the user belongs to a predefined capacitance interval indicating that the first portable electronic communication device is in close proximity to the body of the user, the predefined capacitance interval stored in a memory of the first portable electronic device;
   triggering the first portable electronic communication device to initiate BCC by itself with the second portable electronic communication device in response to the checked capacitance belonging to the predefined capacitance interval;
   sending, by means of the first portable electronic communication device itself, a BCC signal over the user's body in response to the checked capacitance belonging to the predefined capacitance interval, the BCC signal comprising short-range wireless communication pairing information to the second portable electronic communication device;

triggering the first portable electronic communication device to prepare a short-range wireless communication by itself with the second portable electronic communication device; and executing the short-range wireless communication between the first and the second portable electronic communication devices if the second portable electronic communication device also is in close proximity to the body of the same user.

7. A method for control of data transfer according to claim 6, further initiating and performing execution of a predefined action before the step of executing a short-range wireless communication comprising:

receiving, in the first portable electronic communication device, short-range wireless communication signals sent from the second portable electronic communication device for initiating a short-range wireless communication between the devices.

8. A method for control of data transfer according to claim 6, further initiating and performing execution of a predefined action after the step of executing a short-range wireless communication comprising:

ending, by means of the first portable electronic communication device itself, the execution of the short-range wireless communication with the second portable electronic communication device if the checked capacitance indicates that the first portable electronic communication device no longer is in close proximity to the body of the user.

9. A method for control of data transfer according to claim 6, further initiating and performing execution of a predefined action after the step of ending the execution of the short-range wireless communication comprising:

unpairing the first portable electronic communication device and the second portable electronic communication device.

10. A method for control of data transfer according to claim 6, further initiating and performing execution of a predefined action in the second portable electronic communication device comprising:

continuously checking, by means of the second portable electronic communication device, if any BCC signal are received over the user's body from the first portable electronic communication device.

* * * * *